United States Patent Office 3,485,583
Patented Dec. 23, 1969

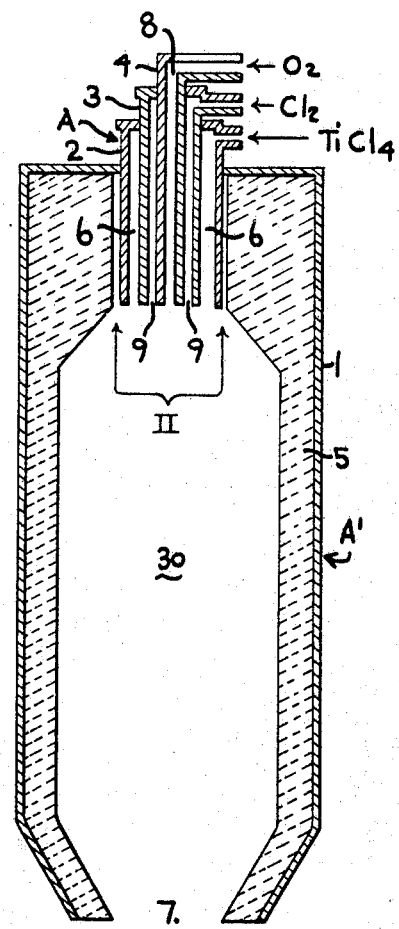

3,485,583
PROCESS FOR PREPARING IMPROVED TITANIUM DIOXIDE
William L. Wilson, Barberton, Ohio, assignor to PPG Industries, Inc., Pittsburgh, Pa., a corporation of Pennsylvania
Filed Oct. 8, 1965, Ser. No. 494,175
Int. Cl. C01g 23/04
U.S. Cl. 23—202                 4 Claims

ABSTRACT OF THE DISCLOSURE

Pigmentary titanium dioxide of improved optical properties is prepared by vapor phase reaction of titanium tetrahalide in the combined presence of a source of thorium and a source of at least one member selected from the group consisting of potassium, rubidium, cesium, sodium, lithium and zinc.

---

This invention relates to a process for producing pigmentary titanium oxide by a vapor phase reaction. More particularly, this invention relates to a process for producing titanium oxide pigment having superior optical properties by the vapor phase oxidation of a titanium halide, e.g., a titanium tetrahalide such as $TiCl_4$, $TiBr_4$, and $TiI_4$.

Typical vapor phase reaction processes are disclosed by U.S. Letters Patents 2,450,156 to Pechukas; 2,240,343 to Muskat; 2,937,928 to Hughes et al.; 2,968,529 to Wilson; 3,069,281 to Wilson; Canadian Patent 517,816 to Krchma et al.; Canadian Patent 609,804 to Wilson; Canadian Patent 639,659 to Wilson; Canadian Patent 631,871 to Wilson; British Patent 979,564 to Wilson; British Patent 876,672; British Patent 726,250; and British Patent 922,671. The vapor phase reaction may also be conducted in a fluidized bed, e.g., as disclosed in U.S. Letters Patent 2,760,846 to Richmond.

In accordance with the practice of this invention, titanium oxide is produced by a vapor phase reaction in the presence of a thorium source and a source of at least one metal selected from the group consisting of potassium, rubidium, cesium, sodium, lithium, and zinc.

In one embodiment of this invention, it is contemplated producing titanium oxide pigment by a vapor phase reaction in the presence of at least one source of thorium, zinc, and at least one alkali metal of the group consisting of potassium, rubidium, cesium, sodium, and lithium.

Specific combination contemplated in the practice of this invention include, not by way of limitation, Th and Li          Th, Zn and Li
Th and Na          Th, Zn and Na
Th and K           Th, Zn and K
Th and Rb          Th, Zn and Rb
Th and Cs          Th, Zn and Cs
Th and Zn It has been discovered that when titanium oxide is prepared in accordance with the present invention, there is produced a titanium oxide particle having optimum pigmentary properties, particularly tint tone and tinting strength, for a given particle size distribution range.

More particularly, there is produced a raw, uncoated pigmentary titanium oxide particle having improved dispersion, a tinting strength of at least 1600, usually at least 1700, a blue undertone (tint tone), and a particle size distribution range below 1.0 micron in mean diameter, preferably 0.2 to 0.5 micron, with a final tinting strength of at least 1780, usually above 1800, when the raw pigment is wet treated or coated as disclosed, for example, by U.S. Letters Patent 3,146,119 issued to Dr. Hartien S. Ritter; copending U.S. patent application Ser. No. 469,881, filed July 6, 1965 by Dr. Harry Lott, Jr. and Dr. Albert Dietz; and copending U.S. patent application Ser. No. 469,864, filed July 6, 1965 by Dr. Albert Dietz and Dr. Harry Lott, Jr.

Sources of the metals noted hereinbefore include, not by way of limitation, each metal in elemental state, alloys containing one or more of the metals, and organic and/or inorganic compounds containing one or more of the various metals.

Preferably, each metal source is one which will react with an oxidizing agent and form an oxide of the metal at the vapor phase reaction temperature although it is not intended to represent that the source material actually forms such oxide; that is, the source should in this instance be capable of forming such oxide whether or not such oxide actually is formed during the vapor phase reaction.

To more specifically describe the process of this invention, reference is made to the drawing, and FIGURES 1 to 3, inclusive, which depict apparatus for practicing the process invention.

FIGURE 1 describes a diagrammatic cross-section view of a concentric orifice-annulus burner fitted in a furnace.

FIGURE 2 further illustrates the construction of the burner of FIGURE 1, representing a view along line I—I of FIGURE 1.

FIGURE 3 illustrates a diagrammatic cross-section view of a burner which may be fitted in the furnace of FIGURE 1 to produce pigmentary titanium dioxide according to the process of this invention.

Referring to FIGURES 1 and 2, reaction zone chamber of furnace A' comprises a concentric steel shell 1 and an internal lining of firebrick 5 (or other heat resistant insulation). At the lower part of furnace A' is a conical bottom terminating at outlet 7. At the upper part of furnace A' is a burner A.

Burner A is composed of three concentric tubes, 2, 3, and 4. Tube 3 is arranged so as to circumscribe tube 4 (forming annulus 6) and tube 2 is arranged so as to circumscribe tubes 3 and 4 (forming annulus 9). Each of the tubes 2 and 3 are evenly spaced from the wall of the tube it circumscribes. This is more clearly shown in FIGURE 2, which shows the tube arrangement taken along line II of FIGURE 1.

In the operating of the reactor of FIGURES 1 and 2, an oxygenating or oxidizing gas typically preheated to at least 900° C., usually at least 1750° C., is fed to the upper opening in tube 4, while an inert gas at room temperature up to the temperature of the oxygenating gas is fed to the opening at the top of tube 3. The oxygenating or inert gas may be preheated with the products of combustion of a selected material, or with a high energy source, e.g., a plasma arc or laser beam.

The inert gas may comprise, not by way of limitation, chlorine, nitrogen, bromine, iodine, argon, helium, krypton, xenon, carbon dioxide, $SO_2$ or mixtures thereof. Concurrently therewith, titanium tetrahalide is fed to the opening at the upper part of tube 2. The titanium tetrahalide has a temperature of 140° C. to about 1200° C.

Referring to FIGURE 3, burner B, which may be fitted in furnace A' of FIGURE 1 in replacement of Burner A, is composed of three concentric tubes annularly arranged. Central oxygenating gas tube 12 is circumscribed by tube 11, which in turn is circumscribed by tube 10, such that there is formed annuli 17 and 16. Tube 11 is provided with an annular lip 13 at its lower end and tube 10 is provided with annular lip 14, such that the titanium tetrahalide and inert gas streams are emitted from the annuli 17 and 16 in a direction substantially perpendicular to the direction of flow of the oxygenating gas from tube 12. In operation, burner B is fed in the same manner as burner A of FIGURE 1.

The source or sources of the various additives, e.g., thorium, zinc, and the alkali metals, can be introduced to the vapor phase reaction together or separately.

Furthermore, such sources can be introduced directly or indirectly to the vapor phase reaction of the titanium tetrahalide and oxygen.

Thus, in the practice of this invention, one or more sources of one or more of the aforementioned additives may be added in conjunction with an inert gas, or one or more of the reactants, or both.

When the process is heated by the combustion of a fuel, one or more sources may be added to the fuel or the products of combustion thereof, e.g., a combustible carbon-containing or sulfur-containing fuel or the combustion products thereof when a process is operated in accordance with U.S. Letters Patents 3,069,282 and 3,105,742.

The source of each selected additive may also be added directly to the reaction zone 30 independently of the reactants, inert gases, or combustible fuels; e.g., one or more sources may be added directly to the reaction zone as an atomized spray in a solid, liquid, or gaseous state.

Furthermore, one or more metallic additives may be added to the zone 30 by employing an inner furnace wall 5 constructed of a ceramic or firebrick material which contains one or more sources of one or more additives, e.g., one or more compounds of thrium, zinc, or alkali metal. Such surce material is gradually eroded into the reaction zone due to the high temperature and corrosive nature of the environment in zone 30, as noted, for example, in British patent specification 672,753.

One or more additives, particularly potassium, may also be introduced into the reaction zone by employing a ceramic dedusting edge, as disclosed in copending U.S. patent application Ser. No. 379,825, filed July 2, 1964, which contains a source of the particular additive, e.g., lava stone containing about 0.5 to 1.5 percent by weight potassium.

Likewise, the additive may be introduced to the zone 30 by using a baffle as disclosed in copending U.S. application Ser. No. 376,980, filed June 22, 1964, now U.S. Patent 3,382,042, which is constructed out of the selected additive or a source of the additive.

Such sources may also be added directly to the zone 30 or to one or more inert or reactant gas streams by emitting the source from one or more plasma arc electrodes as disclosed, for example, in copending U.S. patent application Ser. No. 354,597, filed Mar. 25, 1964.

The thorium source is added to the vapor phase oxidation reaction in an amount sufficient to insure the presence of 0.0001 to 15.0 percent by weight thorium based on the weight of the titanium oxide formed in the reaction zone.

Preferably, the source of thorium is added in a small, effective amount equivalent to less than 5.0 percent by weight thorium based on the titanium oxide pigment formed, with best results being obtained in the range of 0.001 to 1.0 percent by weight thorium.

The selected metallic source (or sources) of zinc and/or alkali metals may be added to the vapor phase oxidation reaction in amounts ranging from 0.01 to 10,000 parts by weight of each selected metal per million parts by weight of titanium oxide produced by the oxidation reaction.

Generally, there is added less than 6,000 parts by weight of the metal with best results being obtained with 5 to 5000 parts by weight of the metal per million parts by weight of titanium oxide formed by the oxidation reaction.

With certain of the alkali metals such as potassium, it may be more desirable to add substantially less than 1,000 parts by weight per million parts by weight titanium oxide.

Thus, it has been discovered that effective results are obtained when potassium is present in an amount ranging from 1 to 500 parts by weight per million parts by weight titanium oxide produced in the vapor phase oxidation zone.

In the practice of this invention, it is contemplated that sources of other metals may be added to the reaction zone, particularly sources of rutile promoting agents such as aluminum, zirconium, and/or water, or sources of particle size control agents such as silicon and/or water.

The aluminum source may be added to the vapor phase reaction in an amount sufficient to insure the presence of 0.01 to 10.0 percent by weight aluminum based on the weight of the titanium oxide formed.

The zirconium source may be added to the vapor phase reaction in an amount sufficient to insure the presence of 0.001 to 10.0 percent by weight zirconium based on the weight of the titanium oxide formed.

The water source may be added to the vapor phase reaction in an amount sufficient to insure the presence of 0.001 to 5.0 percent by weight water based on the weight of the titanium oxide formed.

The silicon source may be added to the vapor phase reaction in an amount sufficient to insure the presence of 0.0001 to 5.0 percent by weight silicon based on the weight of the titanium oxide produced. It has been discovered that best results are obtained with 0.01 to 1.0, particularly 0.02 to 0.50, percent by weight silicon based on the titanium oxide produced.

When the silicon is used in conjunction with potassium, there is employed about 25 to 50 parts by weight silicon per part by weight potassium, e.g., 500 parts by weight silicon for 10 to 20 parts by weight potassium based on the titanium oxide pigment produced by the vapor phase reaction.

The total of the various metals added to the vapor phase reaction (e.g., Th, Zn, alkali metals, Al, Zr, and Si) should be less than 10.0 percent by weight of the titanium oxide produced with effective results being obtained below about 6.0 percent by weight.

The thorium source can be elemental thorium, $ThH_4$ (thorane), $ThH_3$, $ThH_2$, tetra-1,1-diethylpropoxy thorane, $ThCl_4$, $ThBr_4$, $ThF_4$, $ThI_4$, $ThC_2$, thorium nitrate, thorium sufate, $ThS_2$, $ThOS$, $ThOF_2$, thorium nitride, thorium nitrite, $Th_3(PO_4)_4$, thorium oxalate, $ThOCO_3$, $Th(OH)_4$, $ThO_2$, $Th(CO_3)_2$, hydrates such as $ThF_4 \cdot 8H_2O$, $Th_3(PO_4)_4$ $4H_2O$, $Th(SO_4)_2 \cdot 9H_2O$, $Th(C_2O_4)_2 \cdot 6H_2O$, $ThOCO_3 \cdot 8H_2O$, $Na_6Th(CO_3)_5 \cdot 12H_2O$, thorium iodate, thorium bromate, thorium chlorate, thorium bromate, $K_2ThCl_6$, $RbThCl_6$, $CsThCl_6$, $NaThCl_6$, tetramethoxy thorane, tetraethoxy thorane, tetrapropoxy thorane, tetraisopropoxy thorane, and tetrabutoxy thorane. When the source is thorium oxide, the oxide should have a small mean diameter of less than 1.0 micron, usually less than 0.5 micron, preferably less than 0.15 micron.

The source of the zinc is defined as any organic or inorganic compound of zinc including metallic zinc and zinc alloys, preferably a source of zinc which will react with oxygen at the vapor phase reaction temperature to form a corresponding oxide of zinc although it is not intended to indicate that the source material actually forms such oxide; that is, the source should in this instance be capable of forming a corresponding oxide of zinc whether or not such oxide actually is formed during the vapor phase oxidation reaction. In addition, source as herein employed, is further defined as also including any oxide of zinc providing such oxide has a mean particle size diameter of less 1.0 micron, usually less than 0.5 micron, preferably less than 0.15 micron, as noted hereinbefore.

Typical zinc compounds contemplated herein include, not by way of limitation, both organic and inorganic compounds such as $Zn(C_2H_3O_2)_2$ (zinc acetate),
$Zn(C_2H_3O_2)_2 \cdot 2H_2O$,
$ZnAl_2O_4$ (zinc aluminate),
$Zn(NH_2)_2$ (zinc amide),
$Zn(C_7H_5O_2)_2$ (zinc benzoate),
$3ZnO \cdot 2B_2O_3$ (zinc borate),
$Zn(BrO_3)_2 \cdot 6H_2O$ (zinc bromate),
$ZnBr_2$ (zinc bromide),
$Zn(C_4H_7O_2)_2 \cdot 2H_2O$ (zinc butyrate),
$Zn(C_6H_{11}O_2)_2$ (zinc caproate),
$ZnCO_3$ (zinc carbonate),
$Zn(ClO_3)_2 \cdot 4H_2O$ (zinc chlorate),
$ZnCl_2$ (zinc chloride),
$ZnCrO_4$ (zinc chromate),
$ZnCr_2O_7 \cdot 3H_2O$ (zinc dichromate),
$Zn_3(C_6H_5O_7)_2 \cdot 2H_2O$ (zinc citrate),
$Zn(CN)_2$ (zinc cyanide),
$Zn(H_2O)_6GaF_5 \cdot 5H_2O$ (zinc fluogallate),
$ZnF_2$ (zinc fluoride),
$ZnSiF_6 \cdot 6H_2O$ (zinc fluosilicate),
$Zn(HSO_2 \cdot CH_2O)_2$,
$Zn(OH)HSO_2 \cdot CH_2O$ (zinc formaldehydesulfoxylate),
$Zn(CHO_2)_2$ (zinc formate),
$ZnC_4H_4O_6 \cdot H_2O$,
$ZnC_4H_4 \cdot O_6 \cdot 2H_2O$ (zinc tartrate),
$Zn(SCN)_2$ (zinc thiocyanate),
$Zn(C_5H_9O_2)_2 \cdot 2H_2O$ (zinc valerate),
$[Zn(NH_3)_2]Cl_2$ (zinc diamminezinc chloride),
$Zn(CH_2CH_2CH_2CH_3)_2$ (zinc di-n-butylzinc),
$Zn(C_2H_5)_2$ (zinc diethylzinc),
$Zn(CH_3)_2$ (zinc dimethylzinc),
$Zn(C_6H_5)_2$ (zinc diphenylzinc),
$Zn(CH_2CH_2CH_3)_2$ (zinc di-n-propylzinc),
$Zn(C_6H_4CH_3)_2$ (zinc di-o-tolylzinc),
$Zn(CHO_2)_2 \cdot 2H_2O$ (zinc formate),
$ZnGa_2O_4$ (zinc gallate),
$ZnC_3H_7O_6P$ (zinc glycerophosphate),
$Zn(OH)_2$ (zinc hydroxide),
$Zn(IO_2)_2$ (zinc iodate),
$Zn(IO_2)_2 \cdot 2H_2O$,
$ZnI_2$ (zinc iodide),
$Zn(C_3H_3O_2)_2 \cdot 3H_2O$ (zinc di-lactate),
$Zn(C_3H_3O_2)_2 \cdot 2H_2O$ (zinc di-lactate),
$Zn(C_{11}H_{11}O_2)$ (zinc laurate),
$Zn(MnO_4)_2 \cdot 8H_2O$ (zinc permanganate),
$Zn(NO_3)_2 \cdot 3H_2O$ (zinc nitrate),
$ZnN_2$ (zinc nitride),
$ZnO$ (zinc oxide),
$Zn(C_4H_7O_2)_2$ (zinc acelylacetonate),
$Zn(C_4H_5O_4)_2$ (zinc 1-phenol-4-sulfonate),
$Zn_3(PO_4)_2$ (zinc ortho phosphate),
$Zn_3(PO_4)_2 \cdot 4H_2O$,
$Zn_3(PO_4)_2 \cdot 8H_2O$,
$Zn_3(PO_4)_2 \cdot 2H_2O$,
$Zn_2P_2O_7$ (zinc pyrophosphate),
$Zn_2P_2$ (zinc phosphide),
$Zn(H_2PO_2)_2 \cdot H_2O$ (zinc hypophosphite),
zinc picrate,
$Zn(C_7H_5O_3)_2 \cdot 3H_2O$ (zinc salicylate),
$ZnSeO_4 \cdot 5H_2O$ (zinc selenate),
$ZnC_2O_4 \cdot 2H_2O$,
$ZnC_2O_4$ (zinc oxalate),
zinc oleate,
$ZnSiO_2$ (zinc metasilicate),
zinc stearate,
$ZnSO_4$ (zinc sulfate),
hydrates of zinc sulfate,
$ZnS$, $ZnS \cdot H_2O$,
$ZnSO_2$ (zinc sulfite).

Likewise, zinc alloys may be used.

The potassium source can be elemental potassium, a potassium compound, or a potassium ally. Examples, not by way of limitation, of potassium compounds include both organic and inorganic compounds such as $KHC_6H_3O_8$ (potassium saccharate acid), $$KOC_6H_4NO_2 \cdot 2H_2O$$

(potassium - m - nitrophen oxide or potassium - p - nitrophen oxide), $KHC_4H_4O_4 \cdot C_4H_6O_4$ (potassium hydrogen succinate), $K_2SO_4$ (potassium sulfate), $KHSO_4$ (potassium hydrogen sulfate), $K_2S_2O_7$ (potassium pyrosulfate), $K_2S_2O_8$ (potassium peroxydisulfate), $K_2S$ (potassium monosulfide), $K_2S \cdot 5H_2O$, $KHS$ (potassium hydrosulfide), $K_2S_2$ (potassium disulfide), $K_2S_2 \cdot 3H_2O$, $K_2S_3$ (potassium trisulfide), $K_2S_4$ (potassium tetrasulfide), $K_2S_2 \cdot 2H_2O$, $K_2S_5$ (potassium pentasulfide), $K_2SO_3 \cdot 2H_2O$, $KHSO_3$, $K_2S_3O_5$ (potassium pyrosulfite), $$K_2C_4H_4O_6 \cdot \tfrac{1}{2}H_2O$$

(potassium d-tartrate), $K_2C_4H_4O_6$, $KHC_4H_4O_6$ (potassium hydrogen di-tartrate), $K_2H_4TeO_6 \cdot 3H_2O$ (potassium orthotellurate), $K_2CS_3$ (potassium trithiocarbonate, $KSCN$ (potassium thiocyanate), $K_2S_2O_6$ (potassium dithionate), $K_2S_3O_6$ (potassium trithionate), $K_2S_4O_6$ (potassium tetrathionate), $2K_2S_5O_6 \cdot 3H_2O$ (potassium pentathionate), $K_2Sn_3 \cdot 3H_2O$, $3K_2S_2O_3 \cdot H_2O$ (potassium thiosulfate), $3K_2S_2O_3 \cdot 5H_2O$, $KHC_5H_2N_4O_3$ (potassium acid urate), $KC_2H_3O_2$ (potassium acetate), $$KC_2H_3O_2 \cdot HC_2H_3O_2$$

(potassium acid acetate), $KC_9H_7O_4 \cdot 2H_2O$ (potassium acetylsalicylate), $KNH_2$ (potassium amide) $KNH_4C_4H_4O_6$ (potassium ammonium tartrate), $$KAuO_2 \cdot xH_2O$$

$KN_3$ (potassium azide), $KC_7H_5O_2 \cdot 3H_2O$ (potassium benzoate), $K_2B_2H_6$ (potassium diborane), $K_2B_2H_6O_2$ (potassium dihydroxy diborane), $K_2B_5H_9$ (potassium pentaborane), $KBO_2$ (potassium metaborate), $K_2B_4O_7 \cdot 8H_2O$ (potassium tetraborate), $KB_5O_8 \cdot 4H_2O$ (potassium pentaborate), $KBO_3 \cdot \tfrac{1}{2}H_2O$ (potassium peroxyborate), $KC_4H_4BO_7$ (potassium borotartrate), $KBrO_3$ (potassium bromate), $KBr$ (potassium bromide), $KAuBr_4$, $$K_2CrO_4 \cdot 2Cr(OH)CrO_4$$

(potassium chromium chromate, basic), $KCr(SO_4)_2 \cdot 12H_2O$ (potassium chromium sulfate)

$K_3C_6H_5O_7 \cdot H_2O$ (potassium citrate), $KH_2C_6H_5O_7$ (potassium citrate, monobasic), $KOCN$ (potassium cyanate), $KCN$ (potassium cyanide), $KC_2H_5SO_4$ (potassium ethyl sulfate), $K_2GeF_6$ (potassium fluogermanate), $K_2C_{20}H_{10}O_5$ (potassium fluoroescein derivatives), $KPF_6$ (potassium $$KAuO_2 \cdot xH_2O$$

hexafluorophosphate), $KF$ (potassium fluoride), $$KF \cdot 2H_2O$$

$KHF_2$, $KAu(CN)_2$, $KBF_4$ (potassium fluororate),$K_2HPO_3$ (potassium mono hydrogen orthophosphite) $KH_2PO_3$ (potassium di hydrogen orthophosphite), $KHC_8H_4O_4$ (potassium hydrogen phthalate), $KC_6H_2N_3O_7$ (potassium picrate), $KC_{12}H_8O_4$ (potassium piperate), $KC_3H_5O_2 \cdot H_2O$ (potassium propionate), $KC_3H_7SO_4$ (potassium propyl sulfate), $KHC_6H_8O_8$ (potassium acid-d-saccharate, $$KC_7H_5O_3$$

(potassium salicylate), $KC_{15}H_{19}O_4$ (potassium santoninate), $KC_{18}H_{35}O_2$ (potassium stearate), $K_2C_4H_4O_4 \cdot 3H_2O$ (potassium succinate), $KHC_4H_4O_4$ (potassium hydrogen succinate)

$KHC_4H_4O_4 \cdot 2H_2O$, $KFSO_3$ (potassium fluorosulfonate), $K_2ThF_6 \cdot 4H_2O$ (potassium fluorothorate), $K_2TiF_6 \cdot H_2O$ (potassium fluotitanate), $KCHO_2$ (potassium formate), $K_2C_3H_7PO_6$ (potassium glycerophosphate), $KH$ (potassium hydride), $KOH$ (potassium hydroxide), $KIO_3$ (potassium iodate), $KIO_3 \cdot HIO_3$ (potassium acid iodate), $KIO_3 \cdot 2HIO_3$, $KIO_4$ (potassium metaperiodate), $KI$, $KI_3$ (potassium triiodide), $KCl$, $KCl_3$, $KF$, $KF_3$, $KBr$, $KBr_3$, $KC_3H_5O_3 \cdot xH_2O$ (potassium lactate), $KC_{12}H_{23}O_2$ (potassium laurate), $K_2C_4H_4O_5$ (potassium malate), $K_2CH_2(SO_3)_2$ (potassium methionate), $2KCH_3SO_4 \cdot H_2O$ (potassium methyl sulfate), $K_2C_{10}H_6(SO_3)_2 \cdot 2H_2O$ (potassium naphthalene-1,5-disulfonate), $KIBR_2$ (potassium dibromoiodide), $K_2SnBr_6$, $K_2C_{10}H_{14}O_4 \cdot 5H_2O$ (potassium di-camphorate), $K_2CO_3$ (potassium carbonate), $K_2CO_3 \cdot xH_2O$, $KHCO_3$ (potassium hydrogen carbonate), $K_2C_2O_6$ (potassium peroxycarbonate), $(KCO)_6$ (potassium carbonyl), $KClO_3$ (potassium chlorate), $KClO_4$ (potassium perchlorate), $KCl$, $KClO$, $KICl_4$ (potassium chloroiodate), $KICl_2$, $K_2OSCl_6$ (potassium chloroosmate), $K_2RhCl_5$ (potassium pentachlorohodite), $K_2CrO_4$ (potassium chromate), $K_2Cr_2O_7$ (potassium dichromate), $K_3CrO_8$ (potassium peroxychromate), $KNO_3$ (potassium nitrate), $K_3N$ (potassium nitride), $KNO_2$ (potassium nitrite), $KC_{18}H_{33}O_2$ (potassium oleate), $KC_{18}H_{33}O_2C_{18}H_{34}O_2$ (potassium acid oleate), $K_2OsO_4 \cdot 2H_2O$ (potassium osmate), $K_2C_2O_4 \cdot H_2O$ (potassium oxalate), $KHC_2O_4$ (potassium hydrogen oxalate), $KHC_2O_4 \cdot \tfrac{1}{2}H_2O$, $KHC_2O_4 \cdot H_2O$, $KHC_2O_4 \cdot H_2C_2O_4 \cdot 2H_2O$, $K_2O$, $K_2O_2$, $K_2O_3$, $KO_2$, $KC_6H_5SO_4$ (potassium phenyl sulfate), $K_3PO_4$, $K_2HPO_4$, $K_4P_2O_7 \cdot 3H_2O$ (potassium pyrophosphate), $KPO_3$.

Likewise, the corresponding compounds of other alkali metals such as sodium and lithium as well as cesium and rubidium may be used as sources of the respective alkali metal, e.g., sodium, lithium, cesium, and rubidium.

Thus, the cesium source can be elemental cesium, cesium alloys, or a cesium compound similar to the K compounds noted hereinbefore. Examples, not by way of limitation of cesium compounds, include both organic and inorganic compounds as $CsC_2H_3O_2$ (cesium acetate), $CsC_7H_5O_2$ (cesium benzoate), $CsBrO_3$ (cesium bromate), $CsBr$ (cesium monobromide), $CsBr_3$ (cesium tribromide), $CsBrClI$ (cesium bromochloroiodide), $CsIBr_2$ (cesium dibromoiodide), $CsI_2Br$ (cesium bromodiiodide), $Cs_2CO_3$ (cesium carbonate), $CsHCO_3$ (cesium carbonate hydrogen), $CsClO_3$ (cesium chlorate), $CcClO_4$ (cesium perchlorate), $CsCl$ (cesium chloride), $CsAuCl_4$ (cesium chloroaurate), $CsBr_2Cl$ (cesium chlorodibromide), $CsBrCl_2$ (cesium dichlorobromide), $CsICl_2$ (cesium dichloroiodide), $Cs_2SnCl_6$ (cesium chlorostannate), $Cs_2CrO_4$ (cesium chromate), $CsCn$ (cesium cyanide), $CsF$ (cesium fluoride), $CsCHO_2$ (cesium formate), $CsCHO \cdot H_2O$, $CsH$ (cesium hydride), $CsOH$ (cesium hydroxide), $CsIO_3$ (cesium iodate), $CsIO_4$ (cesium metaperiodate), $CsI$ (cesium monoiodide), $CsI_3$ (cesium triiodide), $CsI_5$ (cesium pentaiodide), $CsCl_5$, $CsBr_5$, $CsNO_3$ (cesium nitrate), $CsNO_3 \cdot HNO_3$ (cesium hydrogen nitrate), $CsNO_3 \cdot 2HNO_3$ (cesium dihydrogen nitrate), $CsNO_2$ (cesium nitrite), $Cs_2C_2O_4$ (cesium oxalate), $Cs_2O$ (cesium monoxide), $Cs_2O_2$ (cesium peroxide), $Cs_2O_3$ (cesium trioxide), $CsO_2$ (cesium superoxide), $CsC_8H_4O_4$ (cesium hydrogen phthalate), $CsRh(SO_4)_2 \cdot 12H_2O$ (cesium rhodium sulfate, $CsC_7H_5O_3$ (cesium salicylate), $Cs_2SO_4$ (cesium sulfate), $CsHSO_4$ (cesium hydrogen sulfate), $Cs_2S \cdot 4H_2O$ (cesium sulfide), $Cs_2S_2$ (cesium disulfide), $Cs_2S_2 \cdot H_2O$, $Cs_2S_3$ (cesium tetrasulfide), $Cs_2S_5$ (cesium pentasulfide), $Cs_2S_6$ (cesium hexasulfide).

The rubidium source can be elemental rubidium, rubidium alloys, or a rubidium compound, e.g., similar to the potassium and cesium compounds noted hereinbefore. Examples, not by way of limitation of rubidium compounds, include both organic and inorganic compounds such as $RbC_2H_3O_2$ (rubidum acetate), $RbAl(SO_4)_2 \cdot 12H_2O$ (rubidium aluminum sulfate), $RbBrO_3$ (rubidium bromate), $RbBr$ (rubidium bromide), $RbBr_3$ (rubidium tribromide), $RbIBrCl$ (rubidium bromochloroiodide), $RbIBr_2$ (rubidium dibromoiodide), $RbBrCl_2$ (rubidium dichlorobromide), $RbBr_2Cl$ (rubidium chlorodibromide), $Rb_2CO_3$ (rubidium carbonate), $RbHCO_3$, $RbClO_3$ (rubidium chlorate), $RbClO_4$ (rubidium perchlorate), $RbCl$ (rubidium chloride), $RbICl_2$ (rubidium dichloroiodide), $Rb_2CrO_4$ (rubidium chromate), $Rb_2Cr_2O_7$ (rubidium dichromate), $RbF$ (rubidium fluoride), $Rb_2SiF_6$ (rubidium fluosilicate), $RbFSO_3$ (rubidium fluosulfonate), $RbH$ (rubidium hydride), $RbOH$ (rubidium hydroxide), $RbIO_3$ (rubidium iodate), $RbIO_4$ (rubidium metaperiodate), $RbI$ (rubidium iodide), $RbI_3$ (rubidium triiodide), $RbI \cdot 4SO_2$, $RbMnO_4$ (rubidium permanganate), $RbNO_3$ (rubidium nitrate), $RbNO_3 \cdot HNO_3$ (rubidium hydrogen nitrate), $RbNO_3 \cdot 2HNO_3$, $Rb_2O$ (rubidium monoxide), $Rb_2O_3$, $Rb_4O_6$ (rubidium trioxide), $RbO_2$ (rubidium superoxide), $Rb_2SO_4$ (rubidium sulfate), $RbHSO_4$ (rubidium hydrogen sulfate), $Rb_2S$ (rubidium monosulfide), $Rb_2S \cdot 4H_2O$, $Rb_2S_2$ (rubidium disulfide), $Rb_2S_3$ (rubidium trisulfide), $Rb_2S_5$ (rubidium pentasulfide), $Rb_2S_6$ (rubidium hexasulfide), $RbHC_4H_4O_6$, $Rb_2O_2$ (rubidium peroxide).

Specific sources of sodium or lithium would include elemental sodium and lithium and alloys of same as well as compounds of all the classes listed for potassium, cesium, and rubidium hereinbefore, particularly $NaCl$, $NaBr$, $NaI$, $NaF$, $Na_2SO_4$, $NaHSO_4$, $NaS$, $NaHS$, $NaNH_2$, $Na_2B_2H_6$, $NaH$, $NaOH$, $Na_2CO_3$, $NaHCO_3$, $NaNO_3$, $NaNO_2$, $Na_3N$, $Na_2O$, $Na_2O_2$, $LiCl$, $LiI$, $LiBr$, $LiF$, $Li_2SO_4$, $LiHSO_4$, $LiS$, $LiHS$, $LiNH_2$, $Li_2B_2H_6$, $LiH$, $LiOH$, $Li_2CO_3$, $LiHCO_3$, $LiNO_3$, $LiNO_2$, $Li_3N$, $Li_2O$, and $Li_2O_2$.

Alloys or ceramics may also be used as a source of one or more of the aforementioned alkali metals. Although it is particularly desirable that alkali oxides be in a finely-divided state, e.g., less than 1.0 micron in mean diameter, a ceramic or alloy source does not have to be in a finely-divided state, particularly when a ceramic or metal reactor wall is the source.

Rutile promoting agents as contemplated herein include sources of aluminum, zirconium, and/or water.

Rutile promoting sources of aluminum and zirconium include any organic or inorganic compound of aluminum, zirconium, or both, including metallic aluminum or zirconium, which will react with oxygen at the vapor phase reaction temperature (of the titanium tetrahalide and oxygen) to form the corresponding metal oxide although it is not intended to indicate that the source material actually forms such oxide; that is, it is preferred that the source should in this instance be capable of forming the corresponding aluminum or zirconium oxide whether or not such oxides actually are formed during the vapor phase oxidation reaction. In addition, source as herein employed is further defined as also including the oxides of aluminum or zirconium providing such oxide is finely divided, as noted hereinbefore, e.g., having a mean particle size diameter of less than 1.0 micron, generally less than 0.5 micron, with best results obtained below 0.15 micron.

Specific sources of aluminum include, not by way of limitation, metallic aluminum, organic and inorganic compounds containing aluminum including oxides, hydroxides, nitrates, nitrides, sulfides, sulfates, and halides such as $Al(C_2H_3O_2)_3$ (aluminum acetate), $Al(OH)(C_2H_3O_2)_2$ (aluminum acetate, basic), $AlC_6H_5O_7$ (aluminum citrate), $AlCl_3$, $AlCl$, $AlBr_3$, $AlBr$, $AlI_3$, $AlI$, $AlF_3$, $AlF$, $Al(ClO_3)_3 \cdot 6H_2O$ (aluminum chlorate), $Al(OH)_3$, $Al_2O_3$, $Al(NO_3)_3 \cdot 9H_2O$, $Al_2N_2$, $Al(SO_4)_3$, $Al_2S_3$, $H_3AlF_6$, AlN, the aluminum ammonium holides such as $$AiCl_3 \cdot NH_3$$

$NH_4Al(SO_4)_2$, and aluminum containing esters, for example, aluminum compounds containing one or more organic ester radicals with one to ten carbon atoms per radical, e.g., $Al(OC_3H_7)_3$ (aluminum isopropylate or isopropoxide).

Likewise, there may be employed, not by way of limitation, aluminum compounds containing other organic radicals such as hydrocarbons, e.g., paraffins, cycloparaffins, olefins, acetylenes, aromatics, alcohols, phenols, ethers, carbonyls, amines, and benzene rings. Furthermore, there may be used alloys of aluminum providing such alloys are capable of being oxidized. It may in some instances be necessary to use particular alloys in a finely divided state, e.g., of a particle size below 3.0 microns, in order to enhance oxidation.

Specific sources of zirconium include, not by way of limitation, metallic zirconium, organic and inorganic compounds containing zirconium including oxides, hydroxides, oxalates, nitrates, nitrides, sulfides, sulfates, halides, and oxyhalides such as $ZrBr_4$, $ZrCl_4$, $ZrF_4$, $ZrI_4$, $Zr(OH)_4$, $Zr \cdot (NO_3)_4 \cdot 5H_2O$, $ZrO_2$, $Zr(C_2O_4)_2 \cdot 2Zr(OH)_4$ (zirconium oxalate, basic), $Zr(SO_4)_2 \cdot 4H_2O$, $$ZrCl(OH)_3 \cdot 3H_2O$$

$ZrF(OH)_3 \cdot 3H_2O$, $ZrBr(OH)_3 \cdot 3H_2O$, $ZrI(OH)_3 \cdot 3H_2O$, $ZrOCl_2 \cdot 8H_2O$, $ZrOF_2 \cdot 8H_2O$, $ZrOBr_2 \cdot 8H_2O$, $ZrOI_2 \cdot 8H_2O$, and zirconium compounds containing one or more organic radicals, e.g., hydrocarbons, esters, benzene rings, alcohols, olefins, etc., as listed for aluminum. There may also be used alloys of zirconium, providing such alloys are capable of being oxidized. Such alloys may necessarily have to be employed in a finely-divided state as noted for the aluminum alloys.

In addition to additives of aluminum, zirconium, thorium, zinc, and the alkali metals noted hereinbefore, there may be further added a source of silicon.

Silicon source is defined as any organic or inorganic compound of silicon including elemental metallic silicon which will react with oxygen at the vapor phase reaction temperature to form the corresponding metal oxide although it is not intended to indicate that the source material actually forms such oxide; that is, the source should be capable in this instance of forming the corresponding silicon oxide, e.g., $SiO_2$, whether or not such oxide actually is formed during the vapor phase oxidation reaction. In addition, source is further defined as including the oxides of silicon, such as silica, providing such oxide has a mean particle size below 1.0 micron in diameter as noted hereinbefore.

Specific silicon sources contemplated herein include, not by way of limitation, organic and inorganic compounds such as the silicon hydrides (or silanes), organosilicon halides, alkylhalosilanes, alkylalkoxy-silanes, and silicon halides, particularly $SiCl_4$. A typical list of silicon sources is disclosed in my copending U.S. patent application Ser. No. 474,075, filed July 22, 1965, now U.S. Patent 3,356,456, and is incorporated herein by references.

Specific sources of water include water, ice, steam, water of hydration such as $AlCl_3 \cdot 6H_2O$, hydrogen, organic compounds which decompose to form hydrogen or water including the hydrocarbons such as $CH_4$, natural gas, and propane, alcohols such as $CH_3OH$, $C_2H_5OH$, aldehydes such as formaldehyde, ketones such as acetone and methyl ethyl ketone, polyols such as sugars, glycols, carbohydrates such as starch, cotton, and wood, phenol, aromatic hydrocarbons such as benzene, and organic halides such as $CH_3Cl$, $C_2H_5Br$, and $C_6H_4Cl_2$.

Likewise, one or more compounds may be employed as a source of one or more metal additives, for example, $Al_2(SiF_6)_3$ (aluminum silicofluoride), $CsAl(SO_4)_2 \cdot 12H_2O$ (cesium aluminum sulfate), $K_2SiF_6$ (potassium fluosilicate), $K_2SiO_3$ (potassium metasilicate), $K_2Si_2O_5$ (potassium disilicate), $KHSi_2O_5$ (potassium hydrogen disilicate), $K_2ZrF_6$ (potassium fluozirconate), $CsSiF_6$ (cesium fluosilicate), $Al_3Ti_2$, and $AlCl_3 \cdot \frac{3}{4} ZnCl_2$.

Furthermore, there may be employed alloys containing one or more of the aforementioned additives.

Examples of alloys contemplated herein include, not by way of limitation, thorium aluminum, thorium titanium, thorium zirconium, thorium boron, thorium cerium, thorium hydrogen, thorium nitrogen, thorium silicon, thorium sodium thorium sulfur, thorium zinc, and thorium tin.

Among the above sources listed for thorium, zinc, alkali metals, aluminum, zirconium, and silicon, there are certain advantages which will accrue from the use of certain classes of material, for example, the halides, particularly the chlorides.

It is particularly advantageous to conduct the vapor phase oxidation in the presence of sources which will react with oxygen at the temperature of the vapor phase oxidation to form the corresponding metal oxide. It is not intended to indicate that the source materials herein listed for thorium, zinc, alkali metals, aluminum, zirconium, and silicon must actually form the corresponding metal oxide during the vapor phase oxidation. However, it is advantageous if the source material in this instance is capable of forming a metal oxide, regardless of whether such oxide is formed.

Where a metallic source is a high ionizable salt such as KCl, NaCl, LiCl, RbCl, CsCl, it is not necessary for such compound to be capable of forming an oxide at the vapor phase oxidation temperature; that is, good results are obtained by the addition of a highly ionizable source which is not oxidized at the reaction temperature and which remains substantially unchanged chemically, e.g., as analyzed in an effluent stream from the reactor. Thus, when KCl is added to the vapor phase reaction of $TiCl_4$ and $O_2$, it is not oxidized but may be recovered as KCl.

Furthermore, it is also feasible to employ sources which are not highly ionizable and which do not form oxides at the vapor phase oxidation temperature, particularly if such sources are heated to a high temperature by passage through a plasma arc, e.g., in the presence of an inert gas or one of the reactants such as oxygen.

The sources listed hereinbefore may be introduced into the reaction chamber 30 very effectively as solutions in a solvent, e.g., in the form of a spray. Thus, water soluble metal sources of the type herein contemplated can be used in water solutions. Organic metal sources may be used in many cases where they are liquids or gases, or may be used in solutions in common organic solvents which are not adverse to the vapor phase oxidation.

Typical solvents are chloroform, methylene chloride, or like chlorinated aliphatic or aromatic solvents. Other typical slovents include acetones, ketones, benzenes, and alcohols. Such solvents may also be used as a source of water.

It is also advantageous to use materials which vaporize readily and can be introduced in a vapor state. Thus, zinc metals and various zinc halides are advantageous which are volatile at the vapor phase reaction temperature.

The following is a typical working example representing the best mode contemplated by the inventer in the carrying out of this invention.

EXAMPLE

A burner having the configuration of Burner B in FIGURE 3 is employed in conjunction with reaction chamber A' of FIGURE 1.

Titanium tetrachloride ($TiCl_4$) at 1000° C. and 14.7 pounds per square inch absolute pressure is flowed at the rate of 80 millimoles per minute through annulus 17 into reaction zone 30. The $TiCl_4$ contains 2 mole percent of $AlCl_3$ and 0.13 mole percent $SiCl_4$ based on the total moles of $TiCl_4$.

Simultaneously, oxygen at 1000° C. and 14.7 pounds per square inch absolute pressure is flowed at 96 millimoles per minute through passage 15 (tube 12) into the reaction zone 30.

A 30 mole percent chlorine shroud (based on the total moles of $TiCl_4$) at 1000° C. and 14.7 pounds per square inch absolute pressure is flowed through annulus 16.

The reaction zone 30 is preheated and maintained at 1000° C.

Varying amounts of thorium and metals selected from zinc and the alkali metals are added to the oxygen stream. The $AlCl_3$ and $SiCl_4$ additions to the $TiCl_4$ are held constant at 2 mole percent and 0.13 mole percent respectively.

All metals are added as inorganic chlorides, e.g., KCl, CsCl, RbCl, $ZnCl_2$, and $ThCl_4$.

The titanium oxide pigment formed in zone 30 is withdrawn at exit 7 entrained in a gaseous effluent stream. The raw pigment is recovered and is wet coated with hydrous alumina and titania in accordance with the process of U. S. Letters Patent 3,146,119 issued to Dr. Hartien S. Ritter.

The results are tabulated in Table I. All additives are expressed in parts by weight of the particular metal per million parts by weight titanium oxide pigment formed.

Both raw and coated tinting strength (T.S.) are given for the pigment, as well as raw and uncoated tint tone (T.T.).

The tinting strength of pigmentary titanium dioxide may be determined by any of several methods known in the paint industry. One such method is the Reynold's Blue Method, A.S.T.M. D–332–26, "1949 Book of A.S.T.M. Standards," Part 4, page 31, published by American Society for Testing Material, Philadelphia 3, Pa.

TABLE I

| Run No. | Metal additives to $O_2$, p.p.m. titanium oxide | Pigment Raw T.S. | Coated T.S. | Raw T.T. | Coated T.T. |
|---|---|---|---|---|---|
| 1 | None | 1,600 | 1,690 | Brown 6 | Brown 2. |
| 2 | 4,000 Zn, 200 Th | 1,670 | 1,740 | Neutral | Blue 2. |
| 3 | 3,000 Zn, 50 Th | 1,680 | 1,760 | Blue 1 | Do. |
| 4 | 3,500 Zn, 100 Th | 1,670 | 1,750 | do | Do. |
| 5 | 3,500 Zn, 100 Th, 50 K | 1,690 | 1,780 | do | Blue 3. |
| 6 | 200 Rb, 100 Th | 1,660 | 1,740 | Neutral | Blue 1. |
| 7 | 200 Rb, 100 Th, 50 K | 1,680 | 1,770 | do | Blue 2. |
| 8 | 200 Cs, 100 Th | 1,650 | 1,740 | Brown 1 | Blue 1. |
| 9 | 4,000 Zn, 100 Th, 200 Rb | 1,670 | 1,750 | Blue 1 | Blue 3. |

Tint tone or undertone of a titanium dioxide pigment sample is determined by visually comparing a paste of the pigment with a paste of a selected standard.

In the example hereinbefore, a paste of a sample from each run and a paste of a standard is prepared in accordance with A.S.T.M. D–332–26 using carbon black to tint each sample paste to the same depth of grey as the standard.

The standard used has an oil absorption rating of 20.9 as determined by A.S.T.M. D–281–31, an average particle size of 0.25 micron as determined with an electron micrograph, and an assigned undertone value of Blue 2.

The samples obtained from the runs in the example are compared with the standard and an undertone value assigned to the sample by stating whether the sample is bluer or browner than the designated standard.

The more blue a pigment is, the more pleasing are the optical properties of a paint prepared from the pigment. Conversely, the more brown the pigment, the less pleasing the optical properties of the paint.

The undertone scale to be used ranges from a Brown 10 to a Blue 6 as shown hereinafter in Table II.

TABLE II

| | |
|---|---|
| Brown 10 | Brown 1 |
| Brown 9 | Neutral |
| Brown 8 | Blue 1 |
| Brown 7 | Blue 2 (Standard) |
| Brown 6 | Blue 3 |
| Brown 5 | Blue 4 |
| Brown 4 | Blue 5 |
| Brown 3 | Blue 6 |
| Brown 2 | |

While the invention has been described by reference to specific details of certain embodiments, it is not intended that the invention be construed as limited to such details, except insofar as they appear in the appended claims.

I claim:

1. In a process for producing pigmentary titanium dioxide by vapor phase reaction of titanium tetrahalide selected from the group consisting of titanium tetrachloride, titanium tetrabromide and titanium tetraiodide, the improvement which comprises conducting said reaction in the presence of:
   (a) from 0.0001 to 5.0 weight percent, based on titanium dioxide, of thorium, and
   (b) from 0.01 to 10,000 parts, per million parts of titanium dioxide, of at least one member selected from the group consisting of potassium, rubidium, cesium, sodium, lithium and zinc.

2. A process according to claim 1 wherein said reaction is conducted in the presence of from 0.0001 to 5.0 weight percent, based on titanium dioxide, of thorium, and from 5 to 5,000 parts, per million parts of titanium dioxide, of at least one member selected from the group consisting of potassium, rubidium and cesium.

3. A process according to claim 1 wherein the total amount of metals added to the vapor phase reaction is less than 10.0 weight percent, based on titanium dioxide.

4. In a process for producing pigmentary titanium dioxide by vapor phase oxidation of titanium tetrachloride, the improvement which comprises conducting said oxidation in the presence of:
   (a) from 0.0001 to 5.0 weight percent, based on titanium dioxide, of thorium, and
   (b) from 0.01 to 10,000 parts, per million parts of titanium dioxide, of potassium.

References Cited

UNITED STATES PATENTS

| | | | |
|---|---|---|---|
| 3,105,742 | 10/1963 | Allen et al. | 23—202 |
| 3,208,866 | 9/1965 | Lewis et al. | 106—300 |
| 3,228,887 | 1/1966 | Evans et al. | 106—300 XR |
| 3,304,265 | 2/1967 | Evans et al. | 106—300 XR |
| 3,306,760 | 2/1967 | Zirngibl et al. | 106—288 |
| 3,329,483 | 7/1967 | Evans et al. | 106—300 XR |
| 3,337,300 | 8/1967 | Hughes et al. | 23—202 |
| 3,356,456 | 12/1967 | Wilson | 23—202 |

EDWARD STERN, Primary Examiner

U.S. Cl. X.R.

23—345; 106—288, 292, 300